United States Patent [19]
Morault

[11] 3,825,155
[45] July 23, 1974

[54] APPARATUS FOR THE INJECTION OF PLASTIC MATERIALS

[76] Inventor: Gabriel Morault, 9 allee Turenne, Nantes 44, France

[22] Filed: May 18, 1972

[21] Appl. No.: 254,385

[30] Foreign Application Priority Data
May 21, 1971 France .............................. 71.20032

[52] U.S. Cl. .......... 222/146 HE, 222/148, 222/389, 425/190
[51] Int. Cl............................................. B67d 5/62
[58] Field of Search..... 222/146 HE, 533, 532, 535, 222/389, 148; 259/191, 192; 425/188, 190, 244, 243, 247, 251

[56] References Cited
UNITED STATES PATENTS
| | | | |
|---|---|---|---|
| 2,579,809 | 12/1951 | Fellows et al. | 425/190 |
| 3,299,474 | 1/1967 | Ashworth, Jr. | 425/190 X |
| 3,339,240 | 9/1967 | Corbett | 425/247 X |

FOREIGN PATENTS OR APPLICATIONS
| | | | |
|---|---|---|---|
| 1,282,334 | 2/1960 | France | 425/244 |

Primary Examiner—Robert B. Reeves
Assistant Examiner—Joseph J. Rolla
Attorney, Agent, or Firm—Raymond A. Robic; Arthur Schwartz; Peter G. Mack

[57] ABSTRACT

The invention is an apparatus for the injection of pasty materials such as thermoplastic materials, the apparatus including an injection cylinder formed with a material-receiving chamber and an extruder having an outlet face defining an outlet opening for the material. A connecting transfer plate is secured to the injection cylinder in a manner to extend laterally of the cylinder. It is also mounted on the extruding device for pivotal action of the latter about an axis extending laterally of the axis of the injection cylinder. The pivotal action is between an open position wherein the outlet face of the extruder stands free of one face of the transfer plate and a closed position wherein the said one face of the transfer plate stands flat against the outlet face of the extruder. The transfer plate is secured in releasable manner in closed position and has a communication channel for the flow of pasty materials, the channel extending from the outlet opening of the extruder outlet face and opening into the material receiving chamber whereby it becomes accessible for inspection when the apparatus is in open position.

4 Claims, 7 Drawing Figures

APPARATUS FOR THE INJECTION OF PLASTIC MATERIALS

The present invention relates to machines for working plastic materials of the type involving a cylinder and a piston injecting the material into moulds, the said cylinder being fed by an extruder. More specifically, the invention relates to an apparatus adapted for use with a transfer plate located between the injection device and the extruder.

Known machines for injection moulding which comprise a screw extruder (with continuous or broken operation) and an injection cylinder of the piston type have the disadvantage that the transfer or communication channel between the two members is not easily cleaned. It is indeed necessary, in order to obtain an adequate flow of the plastic material in the pasty state, to give this channel an appropriate and sometime complicated shape from which it is difficult to remove hardened material. To achieve it, considering this situation, it is necessary to remove many parts resulting in the machine being out of use for extended periods of time.

Certain solutions are known to improve this drawback. For instance, certain manufacturers have mounted the extruding screw co-axially with the injection piston. In this case, the movable members (screw and piston) are heavy; they require high precision mechanical devices and necessitate precautions during operation, thus lowering the reliability of the machine. Cleaning of the members thus put together is a long and delicate operation. All of the other solutions involving the separation of the extruder and of the injection reservoir (the latter comprising a piston having a check-valve, or a double piston with a slide valve, or a piston having a movable rear filling ring, for instance) necessarily involve the presence of a transfer or communication channel which, whatever be its inclination, have the above-mentioned drawbacks which are sometimes worsened by undesired preferential flow zones. Certain materials, for instance the vinyl polychlorides for food which are unstable and without plastifiers, accommodate themselves rather poorly with the such drawbacks.

The device which is the object of the present invention makes it possible to avoid the aforesaid inconveniences while being adaptable to various types of machines. Thus, it is well adapted to a transfer system between the extruder and the injection cylinder, system which may be continuous or discontinuous, with feeding taking place forwardly or rearwardly of the injection piston. When the latter has a check valve and according to a logical arrangement, the said device makes it possible for the transfer channel to open up rearwardly of the injection cylinder, beginning forwardly of the tip of the extruder screw and this, on the one hand, while improving accessibility to the said channel thus facilitating inspections and clean ups and, on the other hand, while allowing a profile which is compatible with proper flow of the material being transferred. This result is made possible by allowing opening, by means of a simple hinge, of the whole part located forwardly of the extruder. This door or gate is topped by the injection device with its jack which pivots with it. This same operation also gives access to the tip of the extruding screw so that it may be cleaned and the screw dismounted. It also makes it possible to change at will the extruding annulus located around the tip of the said extruder screw in order to obtain a better lamination adapted to the nature of the material being treated. Finally, dismounting of the main injection members is just as fast as that of the transfer members.

According to the invention, the apparatus which includes an injection cylinder formed with a material-receiving chamber and an extruding device having an outlet face defining an outlet opening, essentially comprises in combination therewith a connecting transfer plate secured to the injection cylinder and extending laterally thereof; means mounting the plate on the extruding device for pivotal action of the device about an axis extending laterally of the axis of the injection cylinder and for pivotal action between an open position wherein the said outlet face of the extruding device stands free of one face of the plate and a closed position wherein the said one face of the plate stands against the said outlet face, the plate being then releasably secured in the said closed position. Finally, the plate has a communication channel formed therein for the flow of the pasty material. The channel, in closed position of the extruding device, extends from the outlet opening of the extruder outlet face and opens into the material-receiving chamber whereby the communication channel becomes accessible for inspection in open position of the apparatus.

In a preferred form of the invention, the channel opens into the chamber at the bottom end thereof away from its discharging end and is inclined in the direction of flow of the material in the chamber. Preferably also the upper part of the transfer plate has, mounted on either face thereof and concentrically, the injection cylinder and the injection control jack. The rod of the injection piston extends across the transfer plate through a tight ring having an appropriately shaped forward face for the flow of the material from the communication channel into the material-receiving chamber.

It is believed that other features and advantages of the invention will become apparent from the description that follows of a preferred embodiment of the invention having reference to the appended drawings wherein.

Figures 1, 3:
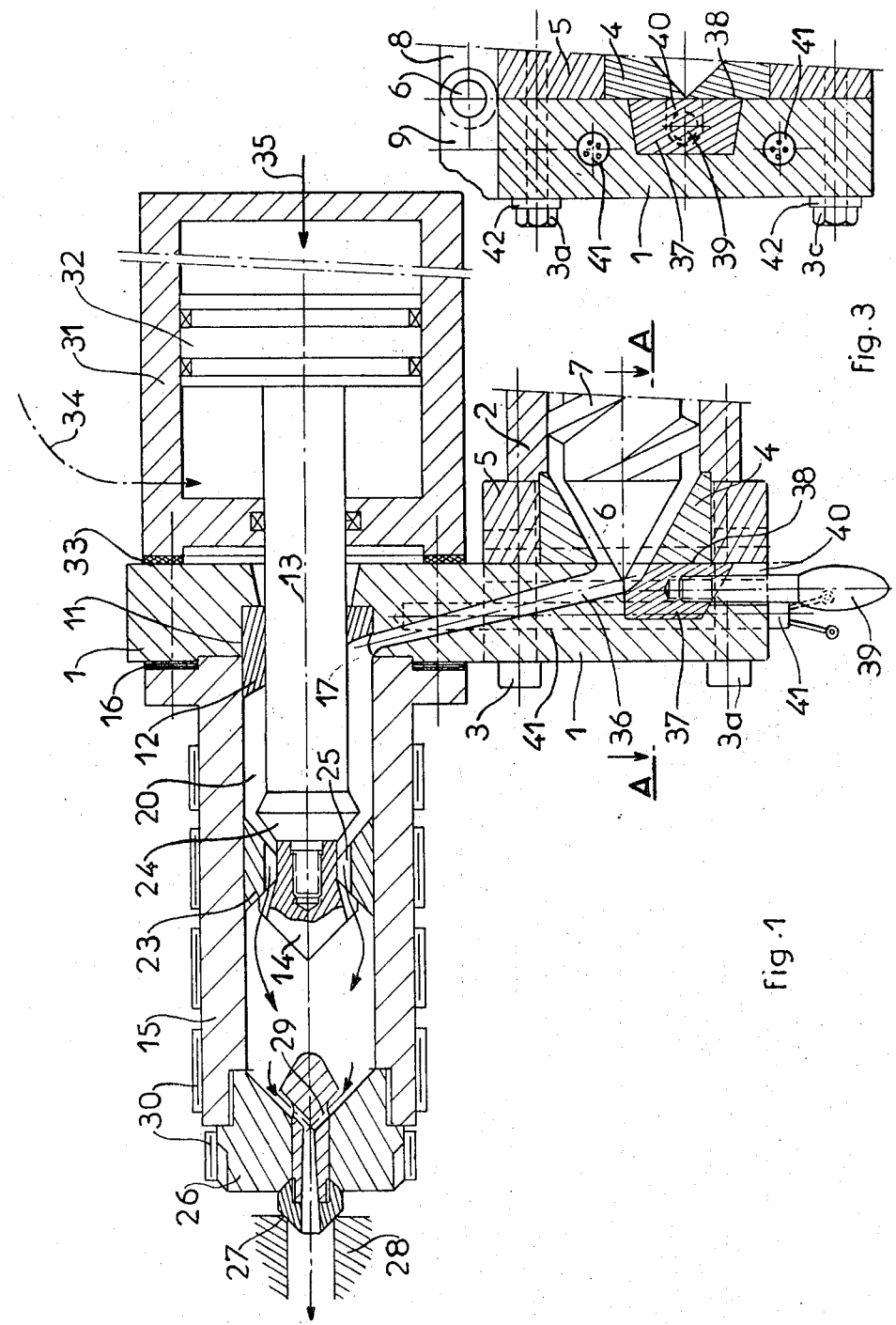
FIG. 1 is a longitudinal cross-sectional view of an injection apparatus incorporating the inventive features and shown in operative position, the discharge end only of the extruder being illustrated.
FIG. 3 is a cross-sectional view taken along line A-A of FIG. 1.
Figure 2:
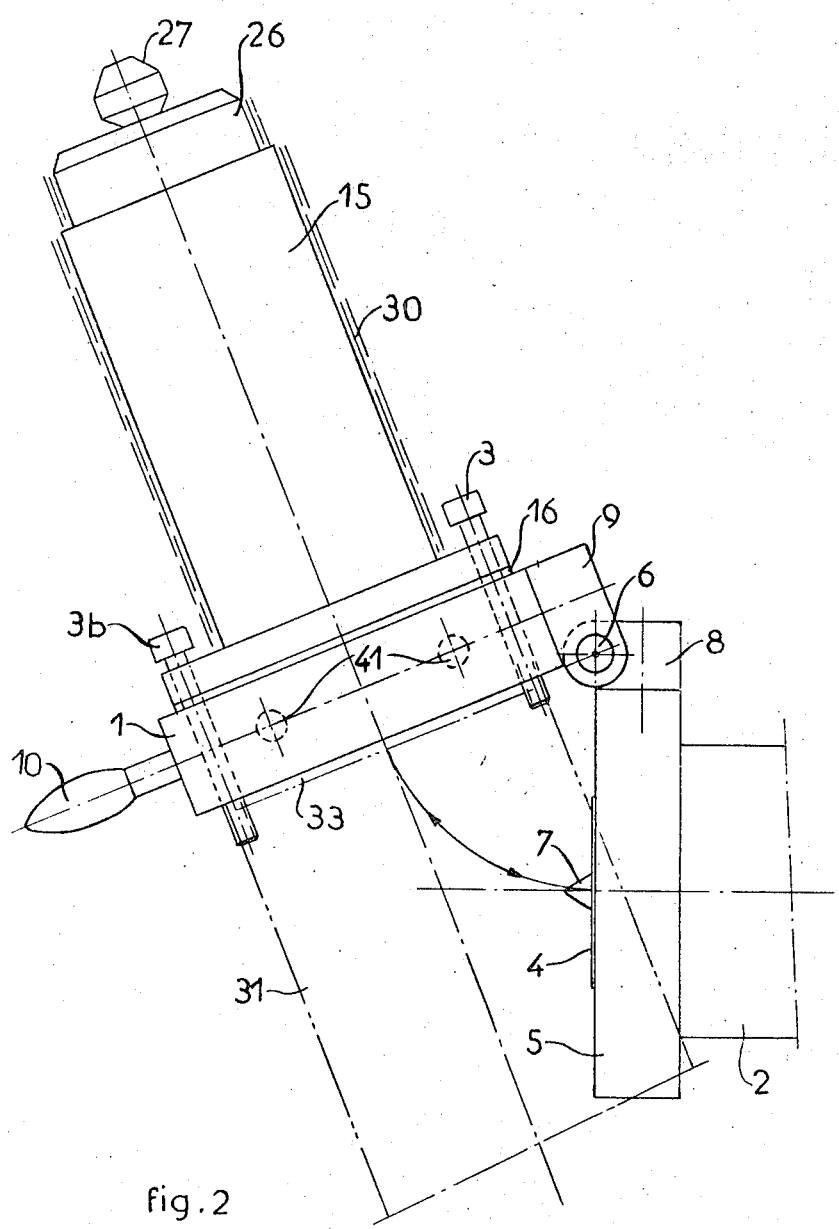
FIG. 2 is a top plan view of the apparatus, illustrated in open position, the injection cylinder and operative jack being shown schematically and in co-axial alignment.
Figure 4:
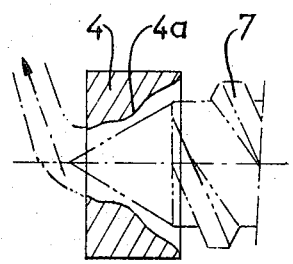
FIG. 4 is a cross-sectional view of the forward end of the extruder intended to illustrate the extruding annulus.

In FIG. 1, showing the apparatus in closed position of the extruder, there is shown a plate 1 clamped over the body 2 of the extruder by means of clamping screws such as 3, 3a, 3b, 3c extending across the plate 1 and received in a flange 5 of the body 2 of the extruder. More specifically, the plate is sealingly applied against the outlet surface of an extruding annulus 4 which may extend past the outlet face of the flange 5 of the extruder by a few millimeters. As best illustrated in FIG. 2, the plate 1 swings around a vertical articulation 6, used as a hinge, whereby the extruding annulus may easily be changed. FIG. 4 illustrates an extruding annulus 4 having a different inner bore profile suitable to obtain proper lamination of the material between the tip of the screw 7 of the extruder and the bore 4a which is approximately conical. It goes without saying that the bearing of these parts one over the other (5–2–4–1) must be machined and trued with sufficient accuracy to insure perfect sealing when clamped together. The hinge 6 must also have sufficient clearance not to hinder clamping of the screws 3, 3a, 3b, 3c. The said hinge 6 has a support 8 which is secured on one side of the flange 5, another support 9 being solid with the edge of the plate 1. A handle 10 (FIG. 2) facilitates opening and closing operations.

Figure 5:
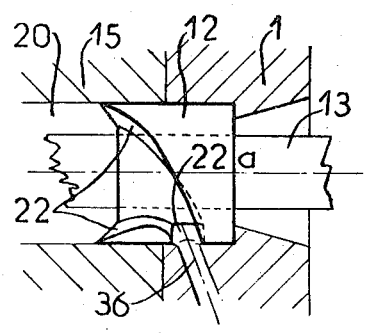
FIG. 5 is a cross-sectional view showing part of the apparatus of the invention involving a flow ring in accordance to a second embodiment.
Figure 6:
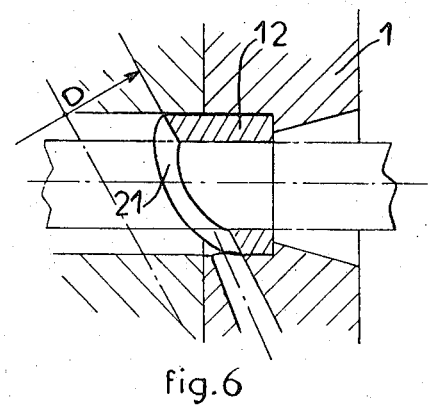
FIG. 6 is a view similar to that of FIG. 5 but illustrating a flow ring according to yet another embodiment.
Figure 7:
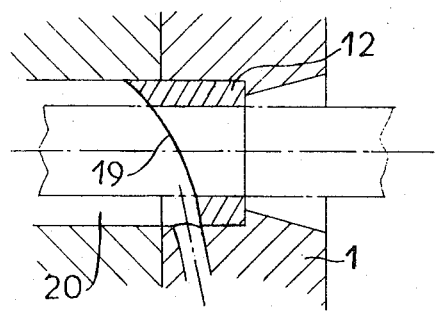
FIG. 7 is another view similar to that of FIG. 5 and illustrating a flow ring according to still a further embodiment.

The upper portion of plate 1 is formed with a bore 11 in which a flow ring 12 tightly fits; a rod 13 of an injection piston 14 slidably and snuggly extending across the bore of the flow ring 12. An injection cylinder 15 is secured over the plate 1 on one face thereof concentrically of the bore 11 and with insertion of a sealing joint 16. The flow ring 12 is also housed in the bore of the cylinder 15 and its purpose is to conveniently direct the flow of the material being discharged from the orifice 17 opening into the bore 11 in order to prevent preferential flow areas and eventually an additional lamination. Flow control is obtained by appropriately shaping the outer face of the flow ring 12 looking into the chamber 20 of the cylinder 15. FIGS. 5, 6 and 7 illustrate various profiles that may be given to the outer face of the flow ring 12. For instance, as shown in FIG. 7, the outer face 19 may be bevelled and given a curve suitable to direct the flow of material into the aforesaid chamber 20. In the alternative of FIG. 6, the outer face 21 may be generated by an imaginary cylinder of radius D. Alternatively again, the flow ring 12 may also be provided with shaped grooves 22 starting with a throat 22a and being directed opposite one another to distribute the paste on either side of the piston rod 13 while orienting the flow in a direction parallel to the axis of the cylinder 15. This alternative is shown in FIG. 5. Any other profile or shape may be adopted according to the nature of the material being treated.

The cylinder 15 has the conventional members necessary for the injection, according to the selected method. These may be, for instance: a skirt 23 acting as a check valve over a portion 24 of the piston with provision for return passages 25, a forward end 26 that may or may not carry a safety valve 27 bearing on the orifice of a mould 28 to free the passages 29 and heating resistances 30 on the outer face.

An injection control motor, as for instance a jack having a body 31, a piston 32 mounted at the end of the rod 13, is secured over the rear face of the plate 1 with insertion of a heat insulating joint 33 between the assembling faces. The jack is preferably hydraulic but may also be pneumatic or electric provided that feeding thereof be constituted by the flexible pipes 34 and 35. Sealing of the flow ring 12 over the rod 13 would not necessary require a special gasket if the sliding surfaces are machined with accuracy as pressure in the chamber 20 is not generally very high.

It is clear that when the plate 1 pivots about the hinge articulation 6, the assembly formed of the cylinder 15, the piston 14 and the motor 31, follows the plate as is shown in FIG. 2 wherein the jack or motor 31 is drawn in dots and dashes.

The straight communication channel 36, which is the main feature, is perforated through the plate 1 with a diameter which is slightly larger at the lower end than at the upper end. It is inclined with respect to the axis of injection in a direction favourable to the flow of the material. To facilitate its machining and its cleaning, a part 37 is added, by setting, in the rear face of the plate 1 (FIGS. 1 and 3, along line A—A). The trued face 38 of the part 37 is in perfect alignment with that of the plate 1 and bears against the extruding annulus, in closed position of the device. It is shaped such that it can easily be removed when the gate-like plate 1 is open. To facilitate its removal, it has a handle 39 that extends downwardly and passes through the plate 1 at a location formed with an appropriate slot 40 opening on the rear face of the plate 1. The latter is further perforated vertically for the reception of one or several heating resistances 41 intended to keep an adequate temperature.

According to an alternative of the plate clamping means, shown in FIG. 3, the heads of the screws 3, 3a, 3b, 3c bear against spring washers 42 which start flexing at a predetermined appreciable force to avoid any over pressure at the tip of the extruder should the channel or the injection orifices be plugged. According to another alternative, the said screws may also be made of steel having a high elastic limit and that stretch and eventually break under forces resulting from abnormal pressures.

The eventual safety valve 27 mounted on the injection end 26 is pushed back by the material and closes when the machine is not coupled over the orifice of the mould 28. In order to inject, it is obvious that an appreciable force must be exerted, from right to left in FIG. 1, on the assembly made up of the feeding, transferring and injection means. Because of the offset between the axis of the injection cylinder and that of the extruder, there is a chance that the body of the extruder may bend. Mechanical jacks are then provided on the extruder bench to nullify these useless forces and deformations.

It goes without saying, as it already resorts from the preceding description, that the invention is not to be limited to the specified embodiment described. It, rather, embraces all possible alternatives, mainly to be adapted to other types of injection or feeding methods. The scope of these alternatives is, besides, set forth in the appended claims.

The apparatus of the present invention may serve on any machine feeding thermoplastic materials to moulds of the continuous or non-continuous injection type provided that it has a feeding member and an injection apparatus.

It may equally find application in the injection of any other powdered, pasty or liquid matter starting from a feeder.

I claim:

1. An apparatus for the injection of plastic materials comprising:

a. an extruding device;
b. an injection cylinder having a piston therein and a motor actuating said piston;
c. a plate connected with said injection cylinder and having a portion extending laterally of said injection cylinder, said extruding device being releasably connected with said laterally extending portion;
d. a communication channel in said plate, said communication channel extending between said extruding device and said injection cylinder;
e. said plate being movable between an open and closed position with respect to said extruding device;
f. said extruding device having a face at one end;
g. said laterally extending portion of said plate including a cavity on one side of said plate, said cavity communicating with said communication channel;
h. said laterally extending portion of said plate including a part removably and adjustably mounted in said cavity, said removable part having a face disposed substantially in the plane of said one side of said plate and said face of said extruding device when said plate is in the closed position, said part being removable when said plate is in the open position to facilitate access to said communication channel.

2. An apparatus as defined in claim 1 wherein one surface of said removable part comprises one portion of said communication channel, said one surface having a curved profile and being continuous with the other portion of said communication channel, said other portion having a linear configuration, whereby removal of said part facilitates removal of hardened material from said communication channel.

3. An apparatus according to claim 1, including an extruding annulus disposed in said extruding device at said one end thereof, said annulus having a flat end face protruding from said face of said extruding device when said plate is in the open position, said face of said removable part and said one side of said plate compressibly engaging said end face of said extruding annulus to provide a tight seal between said extruding device and said plate.

4. An apparatus for the injection of plastic materials comprising:
a. an extruding device;
b. an injection cylinder having a piston therein and a motor actuating said piston;
c. a plate connected with said injection cylinder and having a portion extending laterally of said injection cylinder, said extruding device being releasably connected with said laterally extending portion;
d. a communication channel in said plate, said communication channel extending between said extruding device and said injection cylinder;
e. a piston rod drivingly connecting said piston with said motor;
f. said plate including a bore therein, said piston rod extending through said bore;
g. a ring disposed in said bore for slidable, sealing cooperation with said piston rod, said ring having a surface comprising one end of said injection cylinder;
h. said surface of said ring having such form and being so disposed with respect to said communication channel as to provide a flow path effecting a gentle transition in the direction of flow of material from said communication channel into said injection cylinder.

* * * * *